US 8,184,180 B2

(12) United States Patent
Beaucoup

(10) Patent No.: US 8,184,180 B2
(45) Date of Patent: May 22, 2012

(54) SPATIALLY SYNCHRONIZED AUDIO AND VIDEO CAPTURE

(75) Inventor: Franck Beaucoup, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 534 days.

(21) Appl. No.: 12/410,567

(22) Filed: Mar. 25, 2009

(65) Prior Publication Data

US 2010/0245624 A1  Sep. 30, 2010

(51) Int. Cl.
*H04N 5/262* (2006.01)
*H04R 3/00* (2006.01)

(52) U.S. Cl. ............. 348/240.1; 348/207.99; 348/222.1; 381/56; 381/92

(58) Field of Classification Search .............. 348/231.4, 348/240.1–240.3
See application file for complete search history.

(56) References Cited

U.S. PATENT DOCUMENTS

| | | | |
|---|---|---|---|
| 5,465,302 A | 11/1995 | Lazzari et al. | |
| 6,914,854 B1 | 7/2005 | Heberley et al. | |
| 7,039,199 B2 | 5/2006 | Rui | |
| 7,266,044 B2 | 9/2007 | Yang | |
| 7,701,492 B2 * | 4/2010 | Motomura et al. | 348/240.2 |
| 7,983,907 B2 | 7/2011 | Visser et al. | |
| 7,991,167 B2 * | 8/2011 | Oxford | 381/92 |
| 2006/0244660 A1 | 11/2006 | Ann et al. | |
| 2006/0280312 A1 * | 12/2006 | Mao | 381/56 |
| 2008/0130914 A1 | 6/2008 | Cho | |
| 2009/0119103 A1 | 5/2009 | Gerl et al. | |
| 2009/0310444 A1 | 12/2009 | Hiroe | |
| 2010/0110232 A1 * | 5/2010 | Zhang et al. | 348/240.3 |
| 2010/0217590 A1 | 8/2010 | Nemer et al. | |
| 2011/0038229 A1 | 2/2011 | Beaucoup | |
| 2011/0129095 A1 * | 6/2011 | Avendano et al. | 381/63 |

OTHER PUBLICATIONS

McCowan, "Microphone Arrays: A Tutorial", (report extracted from PhD Thesis "Robust Speech Recognition using Microphone Arrays," Queensland University of Technology, Australia, 2001), downloaded from <http://www.idiap.ch/~mccowan/arrays/arrays.html> on Feb. 25, 2009, 36 pages.

Van Veen, et al., "Beamforming: A Versatile Approach to Spatial Filtering", IEEE ASSP Magazine, (Apr. 1988), 21 pages.

Stokes et al., "Speaker Identification Using a Microphone Array and a Joint Hmm With Speech Spectrum and Angle of Arrival", Multimedia and Expo, 2006 IEEE International Conference on, 2006, pp. 1381-1384.

Schlesinger et al., "Application of MVDR Beamforming to Spherical Arrays", Ambiosonics Symposium, Jun. 2009, 5 pages.

(Continued)

*Primary Examiner* — Ngoc-Yen Vu
(74) *Attorney, Agent, or Firm* — Fiala & Weaver P.L.L.C.

(57) ABSTRACT

An audio/video (A/V) capture device and method that capture audio and video in a spatially synchronized manner. In one implementation, the device and method automatically adjust the shape of a spatial directivity pattern of a microphone array used for acquiring audio so that the pattern is spatially synchronized with an amount of video zoom being applied by a video acquisition section to acquire video. For example, a wider spatial directivity pattern may automatically be used during wide-angle shots and a narrower spatial directivity pattern may automatically be used during close-ups. This beneficially allows for the consistent attenuation of audio signals received from audio sources that lie outside the field of view of the video acquisition section while passing or even enhancing audio signals received from audio sources that lie within the field of view even though the width of the field of view has changed.

23 Claims, 9 Drawing Sheets

OTHER PUBLICATIONS

Lleida et al., "Robust continuous speech recognition system based on microphone array", Acoustics, Speech, and Signal processing, Proceedings of the 1998 IEEE International Conference on vol. 1, 1998, pp. 241-244.

Knapp et al., "The Generalized Correlation Method for Estimation of Time Delay", IEEE Transactions on Acoustics, Speech, and Signal Processing, vol. 24, No. 4, Aug. 1976, pp. 320-327.

Kim et al., "High Resolution Broadband Beamforming based on the MVDR Method", IEEE 2000, pp. 1673-1676.

Chen et al., "Time Delay Estimation in Room Acoustic Environments: An Overview", Hindawi Publishing Corporation, EURASIP Journal on Applied Signal Processing, vol. 2006, Article ID 26503, Sep. 26, 2005, 26 pages.

Carter, "Coherence and Time Delay Estimation", Proceedings of the IEEE, vol. 75, No. 2, Feb. 1987, pp. 236-255.

Campbell, Jr., "Speaker Recognition: A Tutorial", Proceedings of the IEEE, vol. 85, No. 9, Sep. 1997, pp. 1437-1462.

Badidi et al., "A neural network approach for DOA estimation and tracking", IEEE, 2000, pp. 434-438.

* cited by examiner

SPATIALLY SYNCHRONIZED AUDIO AND VIDEO CAPTURE

BACKGROUND OF THE INVENTION

1. Field of the Invention

The present invention generally relates to devices that capture audio and video. In particular, the present invention relates to audio/video (A/V) capture devices that include a video zoom feature.

2. Background

Devices exist that allow a user to capture and record audio and video. Such audio/video (A/V) capture devices include, for example, digital and analog camcorders as well as selected models of digital cameras, cellular telephones and media players. Certain A/V capture devices may also allow a user to capture audio and video for transmission to one or more other devices via a suitable transmission medium.

Conventional A/V capture devices typically include a video acquisition section for capturing video and an audio acquisition section for capturing audio. The video acquisition section may include a zoom lens. A zoom lens comprises a mechanical assembly of lens elements configured such that the focal length of the lens can be varied. Increasing the focal length of the zoom lens increases the magnification of the video image while simultaneously reducing the field of view. Reducing the focal length of the zoom lens reduces the magnification of the video image while simultaneously increasing the field of view. The ability to adjust the focal length of a zoom lens of an A/V capture device in this manner is referred to herein as "video zoom." Increasing the focal length of the zoom lens may also be referred to herein as increasing the level or amount of video zoom while reducing the focal length of the zoom lens may also be referred to herein as reducing the level or amount of video zoom. Video zoom is generally considered a desirable feature because, among other things, it allows a user to capture detailed video of subject matter that is relatively far away from the A/V capture device.

Recently, a distinction has been made between "optical" video zoom and "digital" video zoom. Optical video zoom refers to the adjustment of the focal length of a zoom lens to change the level of magnification and the field of view of the video image as previously described. In contrast, "digital" video zoom does not truly change the level of magnification or the field of view of the video image but instead simulates optical video zoom by enlarging pixels in a portion of a video image and by optionally using an interpolation technique to fill in gaps between the enlarged pixels. As used herein, the term "video zoom" may be used to refer to both optical and digital video zoom. In the context of digital video zoom, increasing the amount of video zoom refers to increasing the amount of enlargement to be applied to a portion of the video image while reducing the amount of video zoom refers to reducing the amount of enlargement to be applied to a portion of the video image.

The audio and video streams captured by conventional A/V capture devices are typically not spatially synchronized. That is to say, assuming that the spatial locations of an A/V capture device and the audio sources that surround it are unchanging, the audio acquisition section of the A/V capture device will generally capture the same level of audio from the same audio sources regardless of whether those audio sources are within the field of view of the video acquisition portion of the A/V capture device. This lack of spatial synchronization may become evident, for example, when a user of an A/V capture device increases the amount of video zoom to obtain a close-up view of a particular object or person. Although certain audio sources may fall outside the field of view of the video image as a result of the increased video zoom, the audio acquisition section of the A/V capture device will continue to capture audio from sources that lie outside the field of view. This can result in the inclusion of undesired audio in the captured A/V stream and lead to confusion about what an audio source might be when the A/V stream is subsequently played back to a user.

BRIEF SUMMARY OF THE INVENTION

An audio/video (A/V) capture device and method are described herein that capture audio and video in a spatially synchronized manner. In one implementation, the device and method automatically adjust the shape of a spatial directivity pattern of a microphone array used for acquiring audio so that the pattern is spatially synchronized with an amount of video zoom being applied by a video acquisition section to acquire video. For example, a wider spatial directivity pattern may automatically be used during wide-angle shots and a narrower spatial directivity pattern may automatically be used during close-ups. This beneficially allows for the consistent attenuation of audio signals received from audio sources that lie outside the field of view of the video acquisition section while passing or even enhancing audio signals received from audio sources that lie within the field of view even though the width of the field of view has changed.

In particular, an audio/video (A/V) capture device is described herein. The A/V capture device includes a video acquisition section, video zoom control logic and an audio acquisition section. The video acquisition section is configured to generate a video signal. The video zoom control logic is configured to control an amount of video zoom applied by the video acquisition section in generating the video signal. The audio acquisition section includes a microphone array and a beamformer. The microphone array is configured to generate a plurality of microphone signals. The beamformer is configured to modify a shape of a spatial directivity pattern of the microphone array responsive to a change in the amount of video zoom applied by the video acquisition section and to process the microphone signals in accordance with the spatial directivity pattern to generate an audio signal. The A/V capture device may further include A/V processing logic that is configured to encode the video signal and the audio signal for subsequent storage and/or transmission.

In one embodiment of the foregoing A/V capture device, the beamformer is configured to reduce a width of a main lobe of the spatial directivity pattern of the microphone array responsive to an increase in the amount of video zoom applied by the video acquisition section and to increase the width of the main lobe of the spatial directivity pattern of the microphone array responsive to a reduction in the amount of video zoom applied by the video acquisition section. In another embodiment, the beamformer is configured to selectively place one or more nulls in and/or selectively remove one or more nulls from the spatial directivity pattern of the microphone array based on the amount of video zoom applied by the video acquisition section.

In a further embodiment of the foregoing A/V capture device, the video acquisition section includes a zoom lens, the video zoom control logic is configured to control an amount of optical video zoom applied by the zoom lens in generating the video signal, and the beamformer is configured to modify the shape of the spatial directivity pattern of the microphone array responsive to at least a change in the amount of optical video zoom applied by the zoom lens.

In a still further embodiment of the foregoing A/V capture device, the video acquisition section includes a digital zoom processor, the video zoom control logic is configured to control an amount of digital video zoom applied by the digital zoom processor in generating the video signal, and the beamformer is configured to modify the shape of the spatial directivity pattern of the microphone array responsive to at least a change in the amount of digital video zoom applied by the digital zoom processor.

A method is also described herein. In accordance with the method, an amount of video zoom applied by a video acquisition section of an A/V capture device in generating a video signal is monitored. A shape of a spatial directivity pattern of a microphone array of the A/V capture device is modified responsive to a change in the amount of video zoom applied by the video acquisition section. A plurality of microphone signals is then received from the microphone array and the microphone signals are processed in accordance with the modified spatial directivity pattern to generate an audio signal. The method may further include encoding the video signal and the audio signal for subsequent storage and/or transmission.

In one embodiment of the foregoing method, modifying the shape of the spatial directivity pattern of the microphone array responsive to the change in the amount of video zoom applied by the video acquisition section includes reducing a width of a main lobe of the spatial directivity pattern of the microphone array responsive to an increase in the amount of video zoom applied by the video acquisition section and increasing the width of the main lobe of the spatial directivity pattern of the microphone array responsive to a reduction in the amount of video zoom applied by the video acquisition section. In another embodiment, modifying the shape of the spatial directivity pattern of the microphone array responsive to the change in the amount of video zoom applied by the video acquisition section includes selectively placing one or more nulls in and/or selectively removing one or more nulls from the spatial directivity pattern of the microphone array based on the amount of video zoom applied by the video acquisition section.

In a further embodiment of the foregoing method, monitoring the amount of video zoom applied by the video acquisition section includes monitoring an amount of optical video zoom applied by a zoom lens and modifying the shape of the spatial directivity pattern of the microphone array responsive to a change in the amount of video zoom applied by the video acquisition section includes modifying the shape of the spatial directivity pattern of the microphone array responsive to at least a change in the amount of optical video zoom applied by the zoom lens.

In a still further embodiment of the foregoing method, monitoring the amount of video zoom applied by the video acquisition section includes monitoring an amount of digital video zoom applied by a digital zoom processor and modifying the shape of the spatial directivity pattern of the microphone array responsive to a change in the amount of video zoom applied by the video acquisition section includes modifying the shape of the spatial directivity pattern of the microphone array responsive to at least a change in the amount of digital video zoom applied by the digital zoom processor.

An alternative (A/V) capture device is also described herein. The alternative A/V capture device includes a video acquisition section, video zoom determination logic and an audio acquisition section. The video acquisition section is configured to generate a video signal. The video zoom determination logic is configured to determine an amount of video zoom applied by the video acquisition section in generating the video signal. The audio acquisition section includes a microphone array and a beamformer. The microphone array is configured to generate a plurality of microphone signals. The beamformer is configured to modify a shape of a spatial directivity pattern of the microphone array responsive to a change in the amount of video zoom applied by the video acquisition section and to process the microphone signals in accordance with the spatial directivity pattern to generate an audio signal.

In one embodiment of the foregoing A/V capture device, the video zoom determination logic is configured to determine the amount of video zoom applied by the video acquisition section by monitoring the state of optics within the video acquisition section. In a further embodiment of the foregoing A/V capture device, the video zoom determination logic is configured to determine the amount of video zoom applied by the video acquisition section by analyzing the video signal generated by the video acquisition section.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 8:
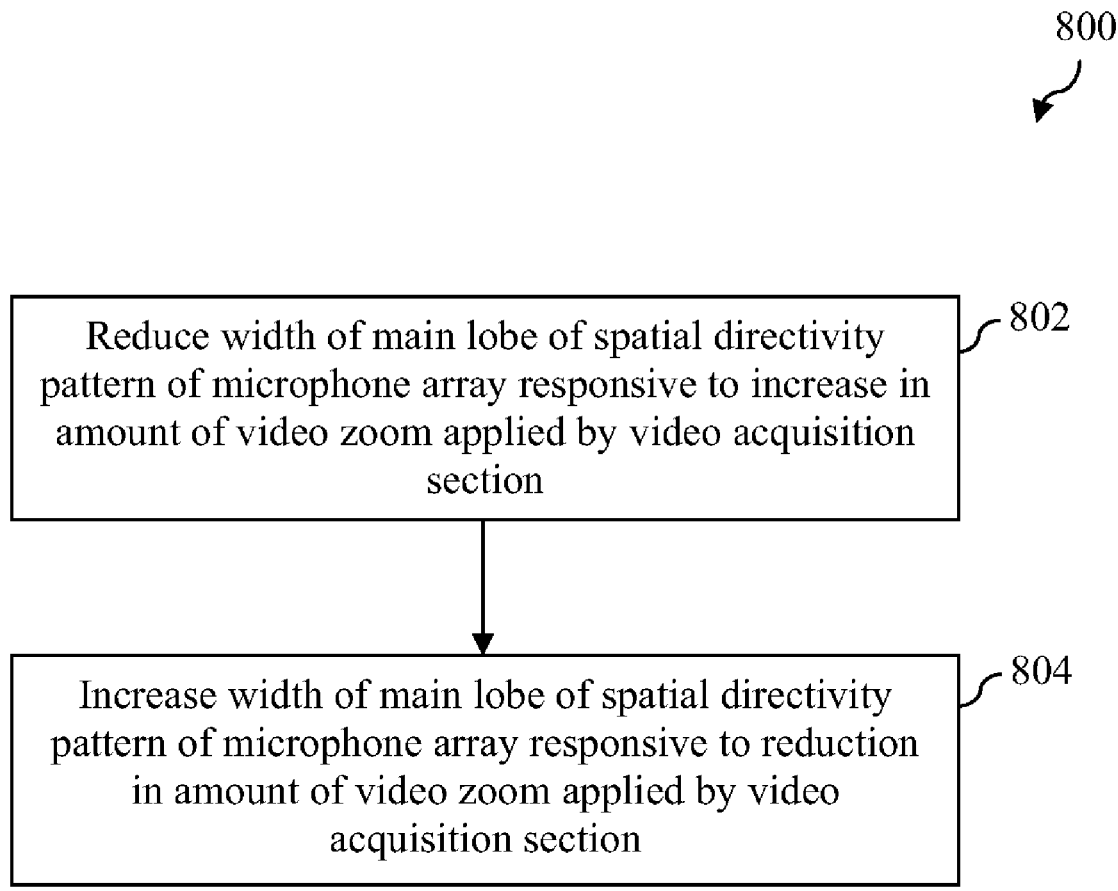
Figure 9:
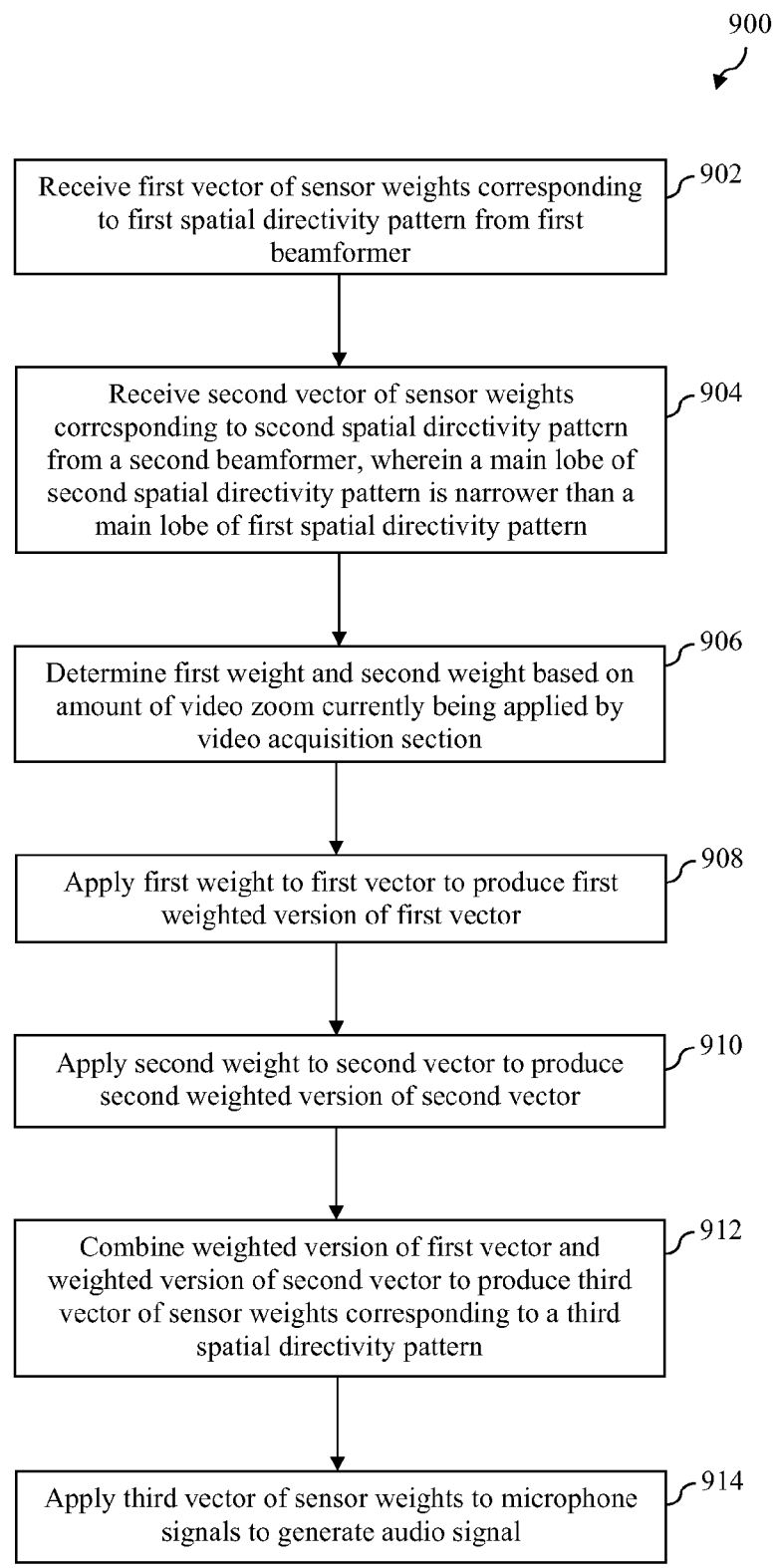

FIGS. 8 and 9 each depict a flowchart of a method for modifying a shape of a spatial directivity pattern of a microphone array within an audio acquisition section of an A/V capture device responsive to a change in an amount of video zoom applied by a video acquisition section of the A/V capture device in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Figure 1:
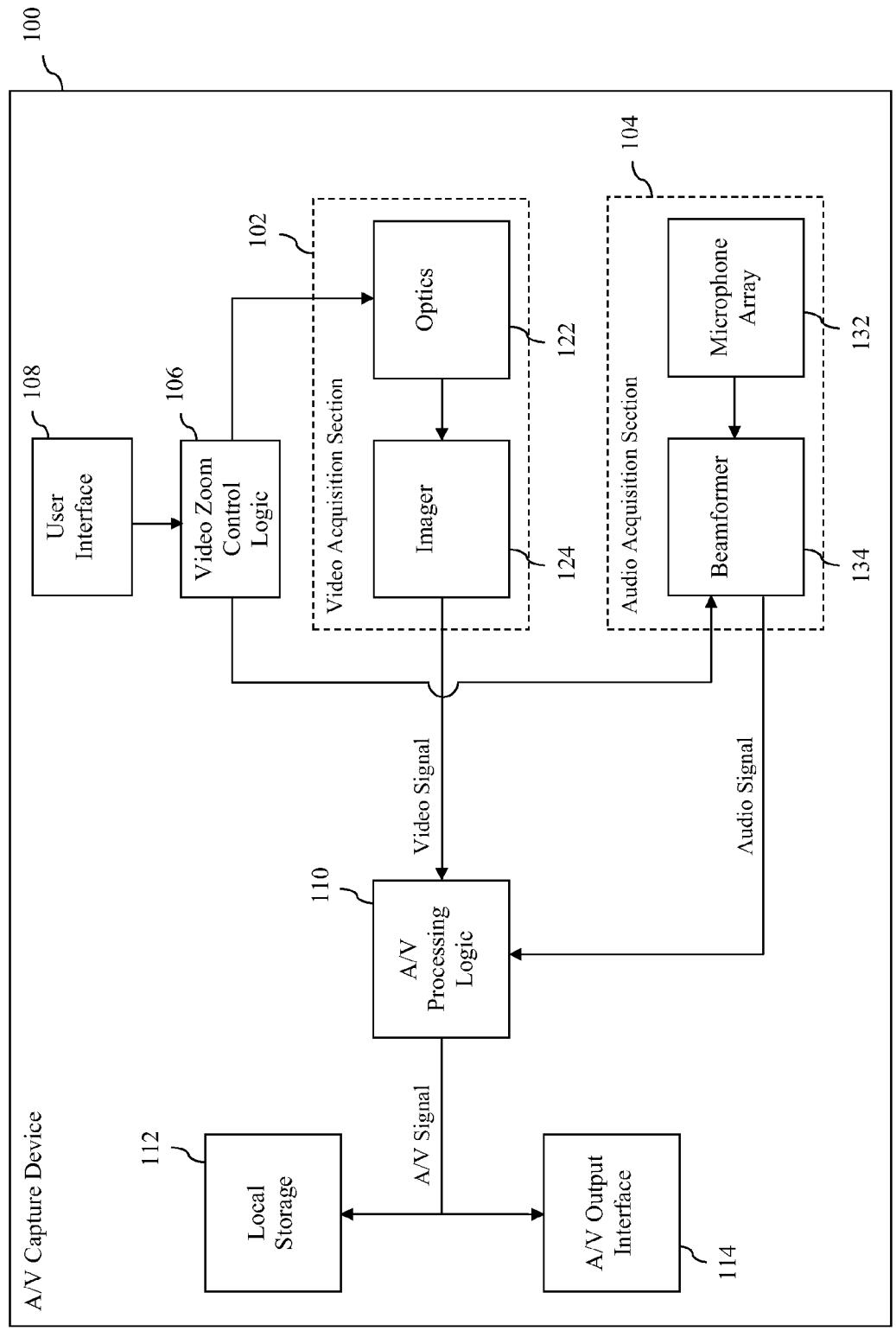
FIG. 1 is a block diagram of an example audio/video (A/V) capture device in which an embodiment of the present invention may be implemented.

B. Example Audio/Video (A/V) Capture Device in which an Embodiment of the Present Invention May be Implemented FIG. 1 is a high-level block diagram of an example audio/video (A/V) capture device 100 in which an embodiment of the present invention may be implemented. A/V capture device 100 is intended to represent any of a variety of devices that are capable of capturing audio and video for recording and/or streaming to another device. Such A/V capture devices may include, but are not limited to, digital and analog camcorders, digital cameras, cellular telephones and media players.

As shown in FIG. 1, example A/V capture device 100 includes a number of interconnected elements including a video acquisition section 102, an audio acquisition section 104, video zoom control logic 106, a user interface 108, A/V processing logic 110, local storage 112 and an A/V output interface 114. Each of these elements will now be briefly described.

Video acquisition section 102 is configured to generate a video signal that is representative of a series of video images. Video acquisition section 102 comprises optics 122 and an imager 124. Optics 122 includes a lens that operates to gather and focus light onto imager 124. Imager 124 operates to convert the incident light into the video signal. In an embodiment, imager 124 comprises a charge-coupled device (CCD) sensor or a complementary metal-oxide-semiconductor (CMOS) active pixel sensor, although these are only examples. The manner by which such sensors operate to convert incident light into a video signal is well known in the art and thus need not be described herein.

The lens within optics 122 comprises a zoom lens. As will be appreciated by persons skilled in the relevant art(s), a zoom lens comprises a mechanical assembly of lens elements that can be manipulated to vary the focal length of the lens. Increasing the focal length increases the magnification of the video image while simultaneously reducing the field of view (also referred to herein as increasing the level or amount of video zoom). Reducing the focal length reduces the magnification of the video image while simultaneously increasing the field of view (also referred to herein as reducing the level or amount of video zoom).

A zoom lens may be described by the ratio of its longest to shortest focal lengths, such that a zoom lens with focal lengths ranging from 100 mm to 400 mm may be described as a "4:1" or 4× zoom lens. Furthermore, an amount of video zoom applied by a zoom lens may be described by the ratio between its current focal length and its shortest focal length, although other methods may be used.

The focal length to be used by the zoom lens for projecting an image onto imager 124 is determined by one or more control signals received from video zoom control logic 106. Thus, video zoom control logic 106 can be said to control the amount of video zoom applied by video acquisition section 102 in generating the video signal. Depending upon the implementation, video zoom control logic 106 may be configured to adjust the amount of video zoom to be applied by video acquisition section 102 automatically (e.g., as part of an auto-focus feature of A/V capture device 100) or in response to user input provided via a user interface 108. User interface 108 may include, for example, an externally-exposed button, dial or lever that allows a user to manually adjust the amount of video zoom to be applied. User interface 108 may also include, for example, a touch-screen display that allows a user to turn on/off features that cause video zoom control logic 106 to automatically adjust the amount of video zoom to be applied.

The video signal output by imager 124 is provided to A/V processing logic 110. Depending upon the implementation, this signal may be an analog or digital signal. In an implementation in which the signal is an analog signal, video acquisition section 102 includes an analog-to-digital (A/D) converter (not shown in FIG. 1) for converting the signal from an analog to digital form.

As also shown in FIG. 1, example A/V capture device 100 includes an audio acquisition section 104. Audio acquisition section 104 includes a microphone array 132 and a beamformer 134.

Microphone array 132 comprises two or more microphones mounted at different spatial locations on or within A/V capture device 100 such that at least a portion of each microphone is exposed to sound waves emanating from audio sources external to A/V capture device 100. Each microphone in the array comprises an acoustic-to-electric transducer that operates in a well-known manner to convert such sound waves into an analog microphone signal. The analog microphone signals produced by microphone array 132 are provided to beamformer 134. In an embodiment, microphone array 132 further comprises a plurality of A/D converters, wherein each A/D converter is configured to convert an analog microphone signal produced by a corresponding microphone to a digital signal prior to transmission to beamformer 134.

Beamformer 134 is configured to process the microphone signals received from microphone array 132 to generate a single audio signal. Beamformer 134 is configured to process the microphone signals in a manner that implements a desired spatial directivity pattern (or "beam pattern") with respect to microphone array 132, wherein the desired spatial directivity pattern determines the level of response of microphone array 132 to sound waves received from different directions of arrival and at different frequencies.

Figure 2:
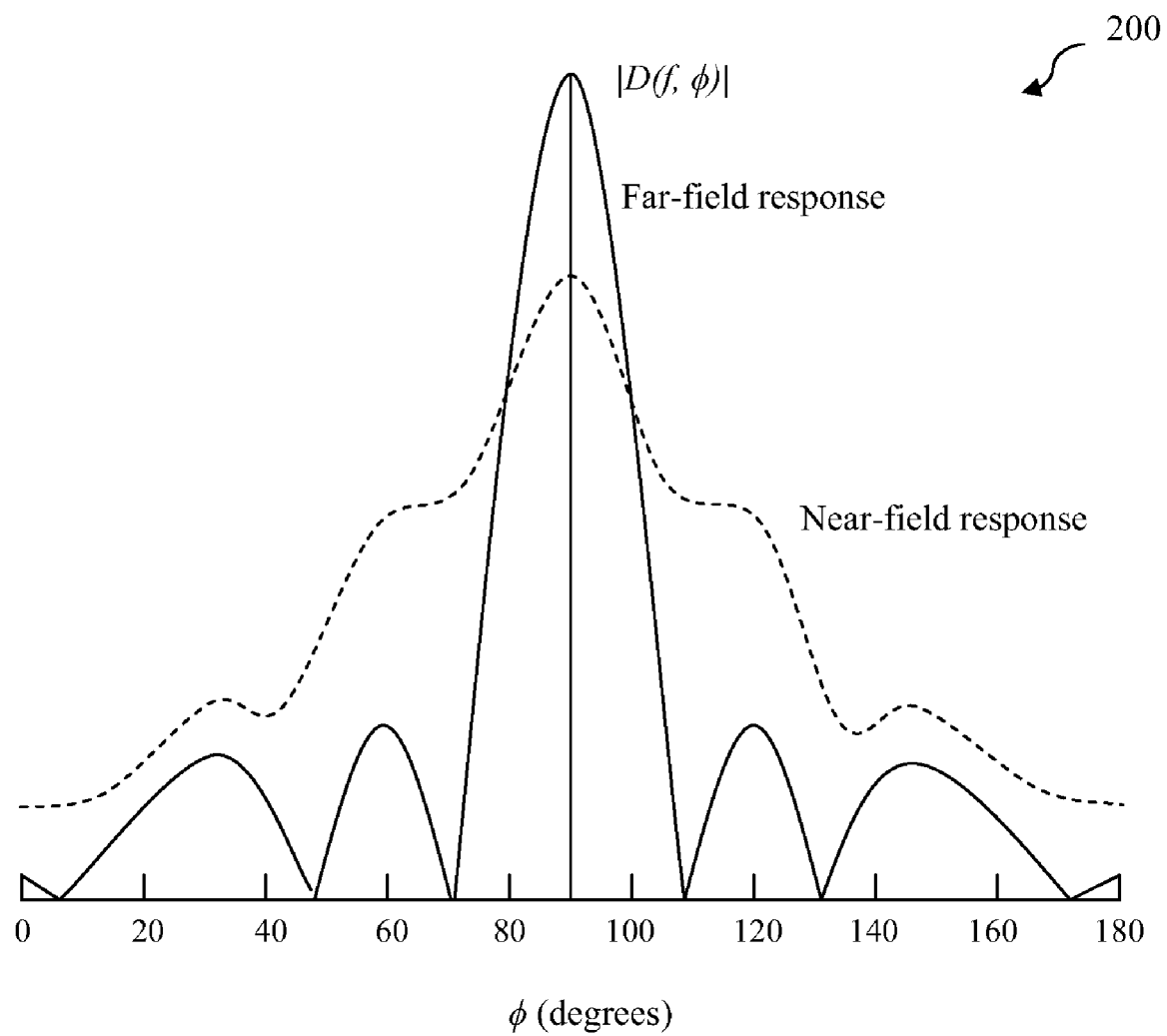
FIG. 2 depicts an example spatial directivity pattern of a microphone array.

As will be appreciated by persons skilled in the relevant art(s), microphone array 132 has an inherent spatial directivity pattern that is dependent upon a number of factors including the size, type, mounting and spatial location of each microphone in the array. FIG. 2 depicts an example spatial directivity pattern 200 of a microphone array that illustrates the response of the array for a near-field audio source (dotted line) and a far-field audio source (solid line). In example spatial directivity pattern 200, the response of the microphone array is plotted on the vertical axis and the angular direction of arrival, denoted φ, is plotted on the horizontal axis. The response shown is for sound waves having a particular frequency f. Other methods of representing a spatial directivity pattern of a microphone array are known in the art.

Beamforming techniques are algorithms that can be used to implement a desired shaping and steering of a spatial directivity pattern of a microphone array, such as microphone array 132. Such techniques operate by determining a real or complex sensor weight to be applied to each microphone signal generated by the microphone array. After the sensor weights have been applied to the respective microphone signals, the results are summed together, thereby achieving a spatial directivity pattern having a desired shape and direction. In a frequency-domain implementation, each sensor weight comprises a complex sensor weight that is expressed in terms of magnitude and phase components and application of the sensor weight to a microphone signal involves multiplying the sensor weight by the microphone signal. In a time-domain implementation, each sensor weight comprises a real sensor filter and application of the sensor weight to a microphone signal involves passing the microphone signal through the filter. Generally speaking, by modifying the sensor weights, a beamforming technique can modify the shape of the spatial directivity pattern of a microphone array as well as control the angular location of one or more lobes and/or nulls of a spatial directivity pattern of a microphone array.

Figure 3:
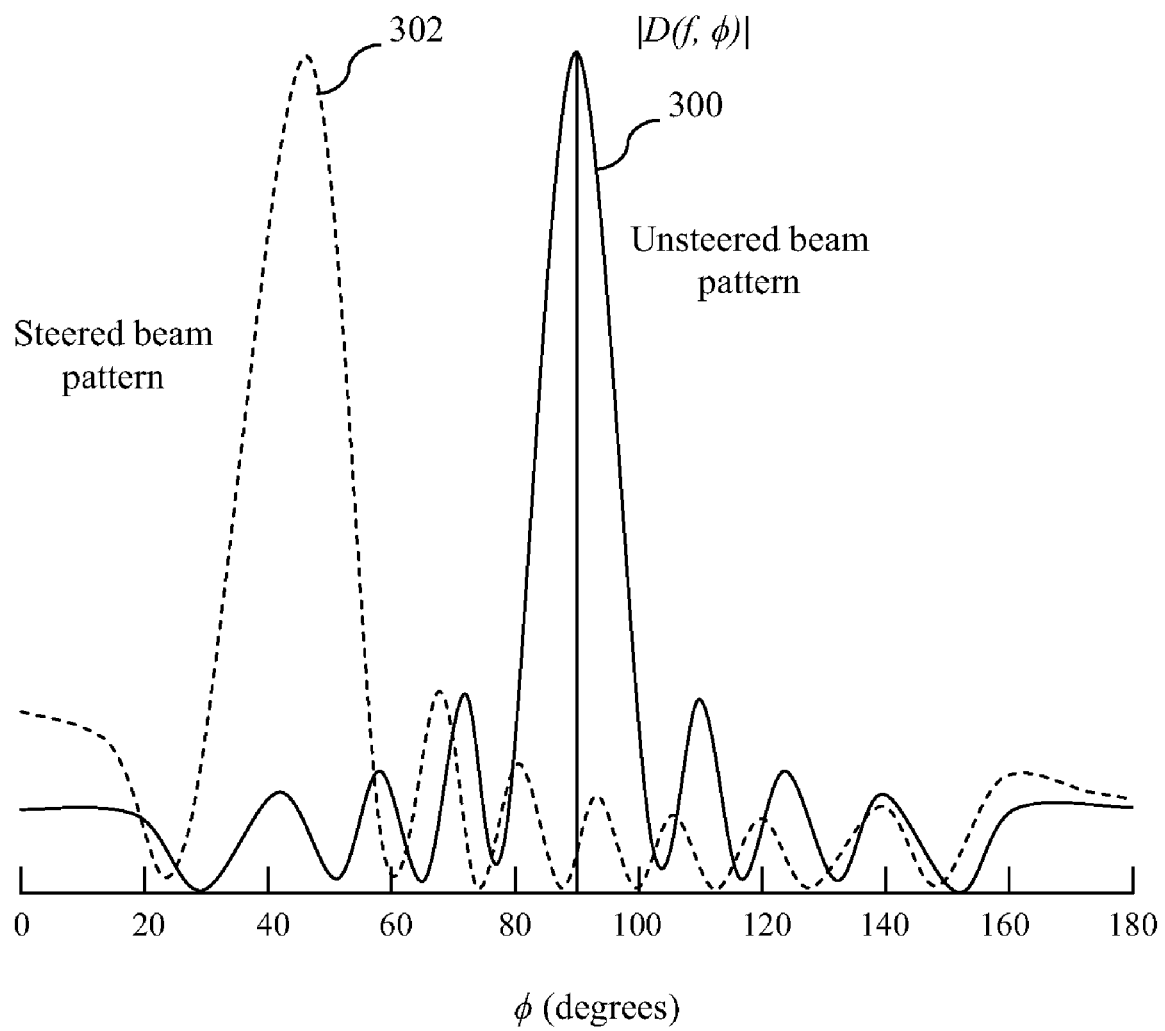
FIG. 3 depicts an example unsteered and steered spatial directivity pattern of a microphone array.

FIG. 3 illustrates an example unsteered spatial directivity pattern 300 of a microphone array achieved using a first set of sensor weights and a steered spatial directivity pattern 302 of the same microphone array achieved using a second set of sensor weights. As used herein, the term "unsteered spatial directivity pattern" refers to a spatial directivity pattern generated by a beamformer when all of the sensor weights applied to the microphone signals are equal to one. In this case, the microphone signals are simply averaged together. As used herein, the term "steered spatial directivity pattern" refers to a spatial directivity pattern generated by a beamformer when at least one of the sensor weights applied to the microphone signals is not equal to one.

As shown in the example of FIG. 3, the application of the second set of sensor weights to the output signals of the microphone array has caused the main lobe (or beam) of spatial directivity pattern to be shifted by approximately 45 degrees. FIG. 3 also illustrates that the application of the second set of sensor weights to the output signals of the microphone array results in a change of shape of the spatial directivity pattern. For example, the main lobe of the spatial directivity pattern has been increased in width, which means that the microphone array will provide greater responsiveness over a wider range of angles.

Various techniques for performing beamforming are known in the art. Such techniques include fixed (or data-independent) beamforming techniques such as delay-sum beamforming, sub-array delay-sum beamforming and super-directive beamforming. Such techniques also include adaptive (or data-dependent) beamforming techniques such as generalized sub-lobe canceler (GSC) and AMNOR (adaptive microphone-array system for noise reduction). These techniques have been described by way of example only and are not intended to be limiting.

Beamformer 134 is configured to apply a beamforming technique (or combination of techniques) to the microphone signals generated by microphone array 132 such that the spatial directivity pattern of microphone array 132 is spatially synchronized with respect to the video currently being acquired by video acquisition section 102. In one embodiment, such spatial synchronization is achieved by (1) ensuring that a main lobe of the spatial directivity pattern is directed or pointed towards subject matter that is within the field of view of the zoom lens within optics 122 and (2) by modifying the shape of the spatial directivity pattern based on the amount of video zoom being applied. Modifying the shape of the spatial directivity pattern may include modifying the width of the main lobe of the spatial directivity pattern based on the current width of the field of view of the zoom lens, as determined by the amount of video zoom being applied. Modifying the shape of the spatial directivity pattern may also include selectively placing one or more nulls in and/or selectively removing one or more nulls the spatial directivity pattern based on the amount of video zoom being applied. Beamformer 134 uses information received from video zoom control logic 106 to determine the amount of video zoom being applied. By performing such spatial synchronization, beamformer 134 can consistently attenuate audio signals received from audio sources that lie outside the field of view of the zoom lens while passing or even enhancing audio signals received from audio sources that lie within the field of view even though the width of the field of view has changed. Various methods by which these two goals may be achieved will be described below.

In one implementation, beamformer 134 is implemented as software executed by a digital signal processor (DSP) incorporated within A/V capture device 100. However, this example is not intended to be limiting, and the techniques performed by beamformer 134 may also be executed in hardware using analog and/or digital circuits or as a combination of hardware and software. Beamformer 134 outputs a single audio signal to A/V processing logic 110.

A/V processing logic 110 operates to encode the video signal received from video acquisition section 102 and the audio signal received from audio acquisition section 104 to generate a combined A/V signal. Depending on the type of encoding used, this process may include compressing one or both of the video and audio signals. A/V processing logic 110 may also perform other functions, such as functions that modify the video and/or audio signals prior to encoding. These processes may be executed, for example, to enhance or achieve certain desired effects with respect to the content of the video and/or audio signals.

Depending upon the implementation, the A/V signal produced by A/V processing logic 110 may be stored in local storage 112 for subsequent playback or transfer to another device. Local storage 112 may comprise any physical medium suitable for storing a representation of the encoded A/V stream. For example, local storage 112 may comprise a videotape cassette, an optical disk, a hard disk drive or a flash memory. However, these are only examples and are not intended to be limiting.

Also depending upon the implementation, the A/V signal produced by A/V processing logic 110 may also be transmitted to another device via A/V output interface 114 for playback by or storage on the other device. A/V output interface 114 may be used, for example, to stream the A/V signal to another device at the time of capture and encoding. A/V output interface 114 may also be used to transfer stored A/V content from local storage 112 to another device. Depending upon the implementation, A/V capture device may also provide interfaces (not shown in FIG. 1) by which the raw video signal produced by video acquisition section 102 and the raw audio signal produced by audio acquisition section 104 may be transmitted to another device.

Example A/V capture device 100 has been described herein by way of example only and is not intended to limit the present invention. As will be appreciated by persons skilled in the relevant art(s) based on the teachings provided herein, embodiments of the present invention may be implemented in A/V capture devices other than that shown in FIG. 1. For example, certain alternate A/V capture device implementations will be described in Section D below. Also, although A/V capture device 100 has been represented as a single device, it is possible that the functional elements shown in FIG. 1 may be distributed among multiple interconnected devices. Accordingly, the term "A/V capture device" as used herein is intended to encompass combinations of devices that operate together to perform A/V capture functions.

C. Example Beamformer Implementation in Accordance with an Embodiment of the Present Invention As described above, in accordance with an embodiment of the present invention, A/V capture device 100 operates (1) to ensure that a main lobe of the spatial directivity pattern of microphone array 132 is directed or pointed towards subject matter that is within the field of view of the zoom lens within optics 122 and (2) to modify the shape of the spatial directivity pattern based on the amount of video zoom being applied. Various methods by which these two goals may be achieved will now be described.

Several approaches may be taken to ensure that the main lobe of the spatial directivity pattern of microphone array 132 is directed or pointed towards subject matter that is within the field of view of the zoom lens. In one embodiment, beamformer 134 is configured to steer a main lobe of the spatial directivity pattern of microphone array 132 so that the main lobe is directed or pointed in a direction that will always lie in the field of view of the zoom lens, regardless of the amount of video zoom being applied. For example, beamformer 134 may be configured to steer the main lobe of the spatial directivity pattern such that it is directed or pointed toward a central point of the field of view of the zoom lens.

It is also possible that microphone array 132 can be designed such that a main lobe of an unsteered spatial directivity pattern of the array is directed or pointed in a direction that will always lie in the field of view of the zoom lens in optics 122, regardless of the amount of video zoom being applied. For example, microphone array 132 may be designed such that a main lobe of an unsteered spatial directivity pattern of the array is directed or pointed toward a central point of the field of view of the zoom lens. In this case, beamformer 134 need not steer the spatial directivity pattern of microphone array 132.

Several approaches may also be taken to modify the shape of the spatial directivity pattern of microphone array 132 based on the amount of video zoom being applied. In one embodiment, beamformer 134 performs this function by reducing a width of a main lobe of the spatial directivity pattern of microphone array 132 responsive to an increase in the amount of video zoom being applied by video acquisition section 102 and by increasing the width of the main lobe of the spatial directivity pattern of microphone array 132 responsive to a reduction in the amount of video zoom being applied by video acquisition section 102. By performing this function, beamformer 134 can consistently attenuate audio signals received from audio sources that lie outside the field of view of the zoom lens while passing or even enhancing audio signals received from audio sources that lie within the field of view even though the width of the field of view has changed.

In another embodiment, beamformer 134 modifies the shape of the spatial directivity pattern of microphone array 132 by selectively placing one or more nulls in the spatial directivity pattern and/or removing one or more nulls from the spatial directivity pattern based on the amount of video zoom being applied. For example, beamformer 134 may be configured to selectively place one or more nulls at one or more angular locations that correspond to areas outside the current field of view of the zoom lens or selectively remove one or more nulls from one or more angular locations that correspond to areas within the current field of view of the zoom lens, wherein the current field of view of the zoom lens is determined based on the amount of video zoom being applied. Thus, for example, as the amount of video zoom being applied increases and the field of view is reduced, beamformer 134 may automatically place one or more nulls in spatial directivity pattern 132 in order to attenuate audio signals received from one or more audio sources that fall outside the current field of view. Conversely, as the amount of video zoom being applied is reduced and the field of view is increased, beamformer 134 may automatically remove one or more nulls from the spatial directivity pattern in order to capture audio signals received from one or more audio sources that now lie within the current field of view.

In a further embodiment, beamformer 134 may be configured to both modify the width of a main lobe of the spatial directivity pattern of microphone array 132 and place and remove nulls in/from the spatial directivity pattern of microphone array 132 based on the amount of video zoom being applied.

Figure 4:
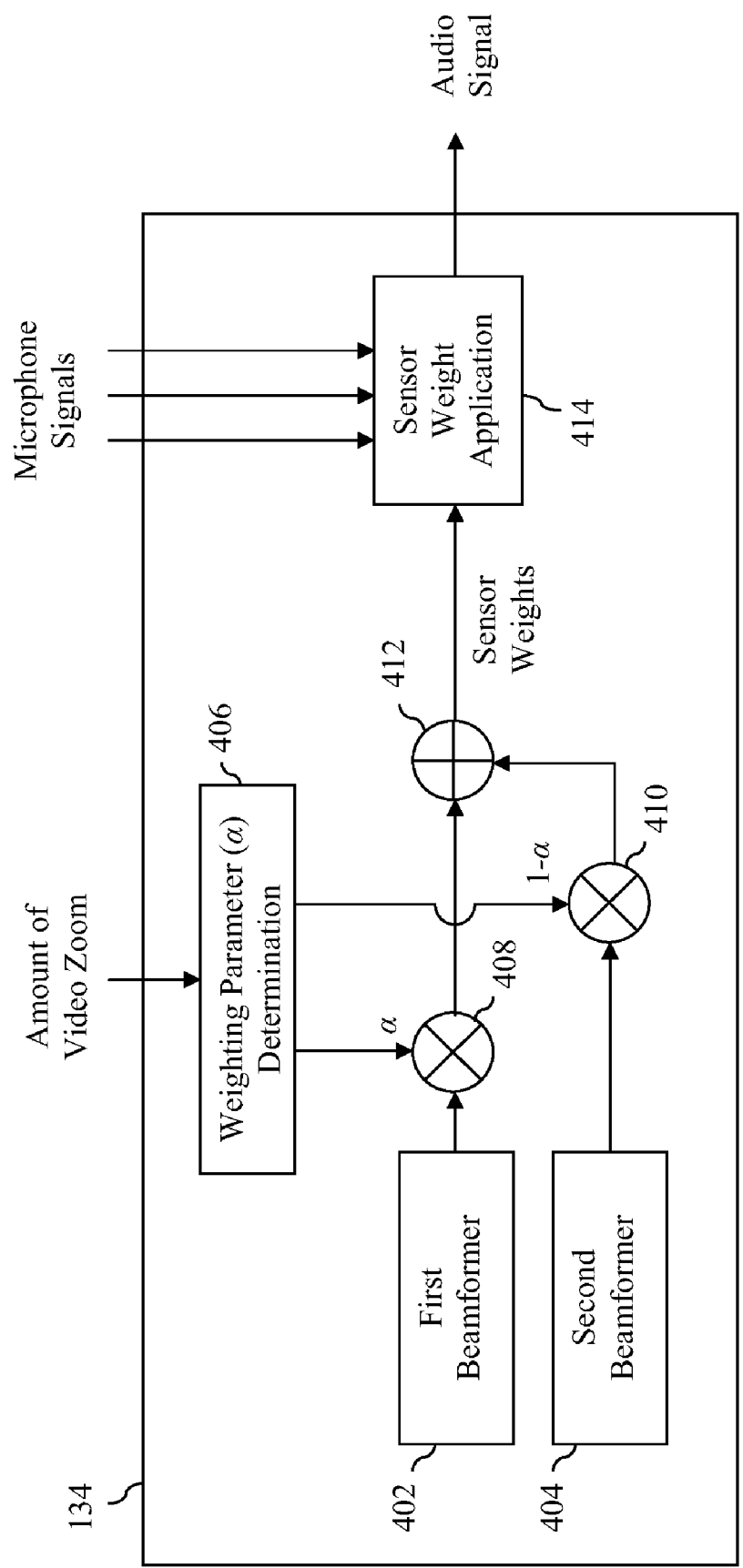
FIG. 4 is a block diagram of a beamformer that may be used to shape a spatial directivity pattern of a microphone array in accordance with an embodiment of the present invention.

In one embodiment, beamformer 134 modifies the width of a main lobe of the spatial directivity pattern of microphone array 132 by combining the outputs of two different types of beamforming techniques in a manner that will now be described in reference to FIG. 4. In particular, FIG. 4 shows a particular implementation of beamformer 134 that includes a first beamformer 402 and a second beamformer 404. First beamformer 402 and second beamformer 404 are each configured to apply a different beamforming technique to steer a main lobe of the spatial directivity pattern of microphone array 132 so that the main lobe is directed or pointed in a direction that will always lie in the field of view of the zoom lens in optics 122, as previously described. However, the beamforming technique applied by first beamformer 402 is configured to produce a main lobe that is wider than the main lobe produced by the beamforming technique applied by second beamformer 404. Thus, first beamformer 402 may be said to be less directive than second beamformer 404. Conversely, second beamformer 404 may be said to be more directive than first beamformer 402.

By way of example, first beamformer 402 may comprise a delay-sum beamformer while second beamformer 404 may comprise a superdirective beamformer, such as a Minimum Variance Distortionless Response (MVDR) beamformer. Generally speaking, delay-sum beamformers tend to be less directive than superdirective beamformers in that delay-sum beamformers produce spatial directivity patterns having main lobes that tend to be wider than superdirective beamformers. The manner in which delay-sum beamformers and superdirective beamformers, including MVDR beamformers, are implemented is well known in the art.

In the embodiment shown in FIG. 4, beamformer 134 varies the width of the main lobe of the directivity pattern of microphone array 134 by combining the outputs of first beamformer 402 and second beamformer 404 in a weighted manner, wherein the weight applied to each output is dependent upon the amount of video zoom being applied by video acquisition section 102. As discussed above, an indication of the amount of video zoom may be provided to beamformer 134 by video zoom control logic 106.

The determination of the weight to be applied to each output is performed by weighting parameter determination logic 406. In particular, weighting parameter determination logic 406 determines a weighting parameter, denoted $\alpha$. A first multiplier 408 multiplies the output of first beamformer 402 by weighting parameter $\alpha$ to produce a first product while a second multiplier 410 multiplies the output of second beamformer 404 by $1-\alpha$ to produce a second product. The two products are then added together by a combiner 412. In an embodiment in which the output of each beamformer 402 and 404 comprises a vector of sensor weights, each multiplier 408 and 410 outputs a weighted vector of sensor weights and combiner 412 adds the weighted vectors to produce a final set of sensor weights. Sensor weight application logic 414 then applies the final set of sensor weights to the microphone signals produced by microphone array 132 to produce an output audio signal. In order to avoid distortion of the output audio signal, processing delays associated with first beamformer 402 and second beamformer 404 may be adjusted so that they match one another.

When the amount of video zoom being applied by video acquisition section 102 increases (thereby narrowing the field of view), weighting parameter determination logic 406 reduces the value of $\alpha$ such that the weight applied to the output of first beamformer 402 is reduced and the weight applied to the output of second beamformer 404 is increased. The result is that the width of the main lobe of the spatial directivity pattern of microphone array 132 will become narrower as the amount of video zoom increases. When the amount of video zoom being applied by video acquisition section 102 is reduced (thereby widening the field of view), weighting parameter determination logic 406 increases the value of $\alpha$ such that the weight applied to the output of first beamformer 402 is increased and the weight applied to the output of second beamformer 404 is reduced. The result is that the width of the main lobe of the spatial directivity pattern of microphone array 132 will become wider as the amount of video zoom is reduced. In an embodiment, $\alpha=1$ when the zoom lens is at the minimum level of video zoom (i.e., maximum wide-angle shooting) and $\alpha=0$ when the zoom lens is at the maximum level of video zoom (i.e., maximum close-up).

The foregoing is only one example of a manner by which beamformer 134 may modify the shape of the main lobe of the spatial directivity pattern of microphone array 132 so that it tracks the current width of the field of view of the zoom lens. In an alternative example, rather than determining the weighted combination of the output of a first beamformer and a second beamformer, beamformer 134 may determine the weighted combination of an unsteered beamformer (i.e., a beamformer that utilizes sensor weights that are all equal to 1) and some form of steered beamforming. In a further alternative example, rather than determining the output of the weighted combination of a first beamformer and a second beamformer, beamformer 134 may apply a single beamforming technique that takes into account the amount of video zoom currently being applied by video acquisition section 102 in implementing the shape of the spatial directivity pattern of microphone array 132. Still other methods may be used.

D. Alternative A/V Capture Device Implementations

Figure 5:
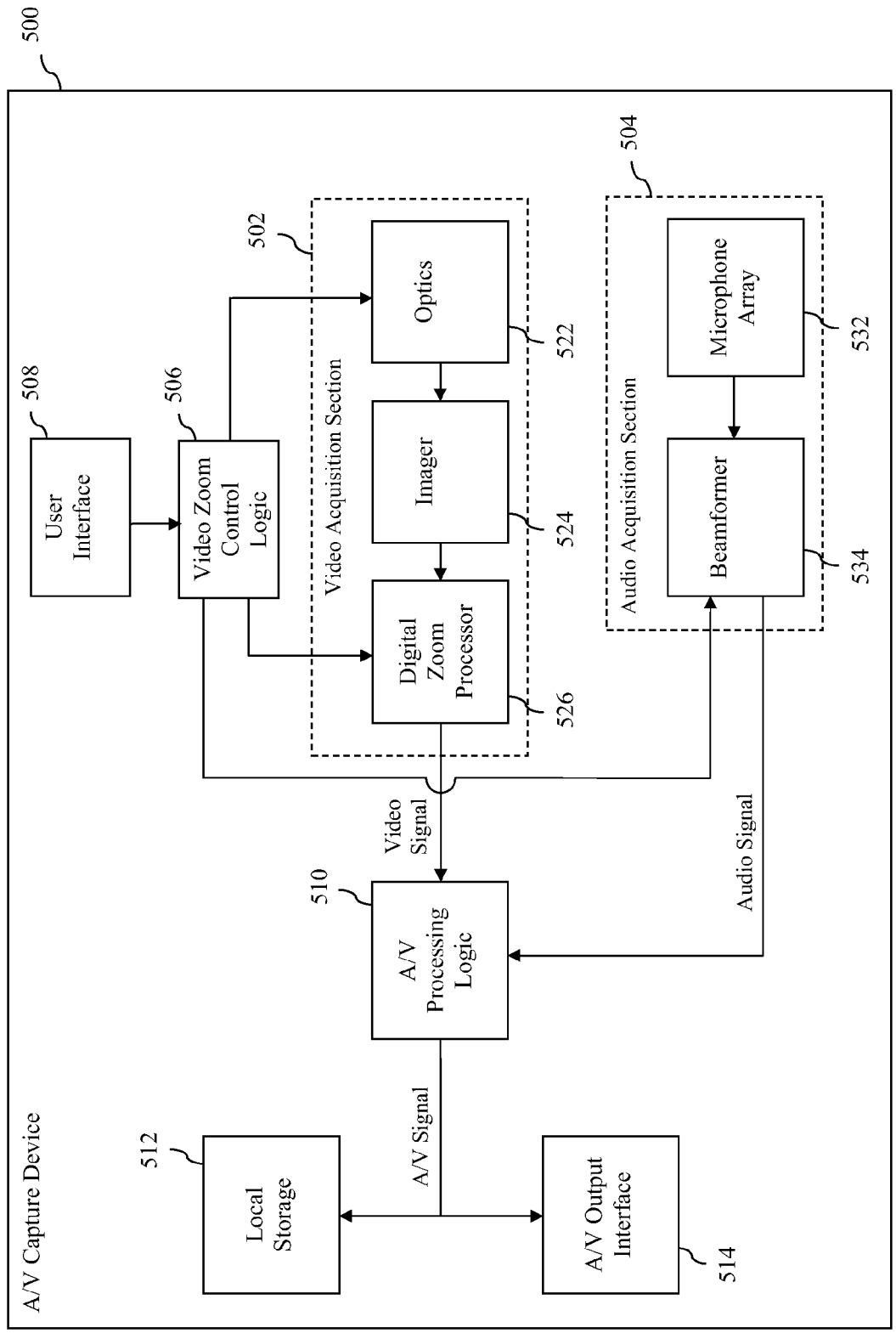
FIG. 5 is a block diagram of an alternate A/V capture device in which an embodiment of the present invention may be implemented.

FIG. 5 is a block diagram of an alternate A/V capture device 500 in which an embodiment of the present invention may be implemented. As shown in FIG. 5, A/V capture device 500 comprises a number of interconnected elements including a video acquisition section 502, an audio acquisition section 504, video zoom control logic 506, a user interface 508, A/V processing logic 510, local storage 512 and an A/V output interface 514. With the exception of certain elements that will be described below, each of these elements operates in essentially the same fashion as like named elements of example A/V capture device 100 as described above in reference to FIG. 1.

As shown in FIG. 5, video acquisition section 502 includes a digital video zoom processor 526. Digital video zoom processor 526 is configured to receive the video signal generated by imager 524 and to apply digital video zoom to the video signal. As discussed above in the Background Section, digital video zoom is different from the video zoom applied by optics 522, which may be referred to as optical video zoom. In particular, digital video zoom does not truly change the level of magnification or the field of view of the video image being acquired but instead simulates optical video zoom by enlarging pixels in a portion of a video image and by optionally using an interpolation technique to fill in gaps between the enlarged pixels.

Although digital zoom processor 526 is shown as operating on the video signal output from imager 524 in FIG. 5, it is possible that digital zoom processor 526 may instead operate on the video signal after it has been processed to some extent by A/V processing logic 510. In either case, digital zoom processor 526 may logically be thought of as comprising a part of video acquisition section 502.

In A/V capture device 500, video zoom control logic 506 is configured to control both the amount of optical video zoom applied by optics 522 and the amount of digital video zoom applied by digital zoom processor 526. Depending upon the implementation, video zoom control logic 506 may be configured to adjust the amount of optical and/or digital video zoom to be applied by either or both of these elements automatically (e.g., as part of an auto-focus feature of A/V capture device 500) or in response to user input provided via a user interface 508. In the context of digital video zoom, increasing the amount of video zoom refers to increasing the amount of enlargement to be applied to a portion of the video image while reducing the amount of video zoom refers to reducing the amount of enlargement to be applied to a portion of the video image.

Beamformer 534 is configured to receive information from video zoom control logic 506 that indicates both the amount of optical video zoom and the amount of digital video zoom being applied by video acquisition section 502. Beamformer 534 is further configured to modify the shape of the spatial directivity pattern of microphone array 532 based on such information in order to achieve spatial synchronization with respect to audio and video capture. Thus, for example, beamformer 534 can narrow the shape of a main lobe of the spatial directivity pattern of microphone array 532 responsive to an increase in the amount of optical video zoom being applied by video acquisition section 502 and/or an increase in the amount of digital video zoom being applied by video acquisition section 502. Also, for example, beamformer 534 can widen the shape of the main lobe of the spatial directivity pattern of microphone array 532 responsive to a reduction in the amount of optical video zoom being applied by video acquisition section 502 and/or a reduction in the amount of digital video zoom being applied by video acquisition section 502.

An embodiment of the present invention may also be implemented in an A/V capture device that implements digital video zoom but not optical video zoom. In accordance with such an implementation, a beamformer within the device would modify the shape of a spatial directivity pattern of a microphone array based on the amount of digital video zoom being applied.

Figure 6:
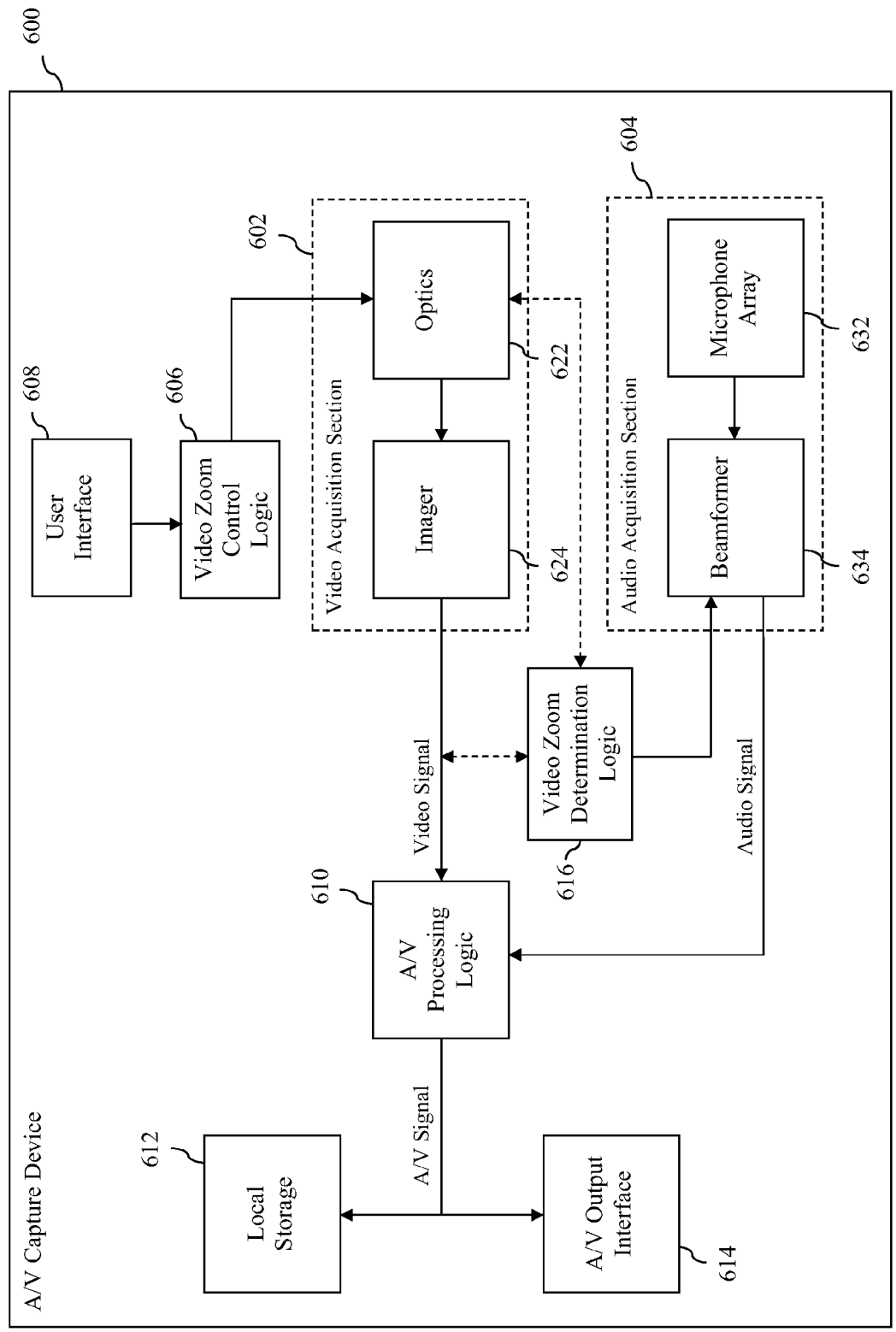
FIG. 6 is a block diagram of a further alternate A/V capture device in which an embodiment of the present invention may be implemented.

FIG. 6 is a block diagram of a further alternate A/V capture device 600 in which an embodiment of the present invention may be implemented. As shown in FIG. 6, A/V capture device 600 comprises a number of interconnected elements including a video acquisition section 602, an audio acquisition section 604, video zoom control logic 606, a user interface 608, A/V processing logic 610, local storage 612, an A/V output interface 614 and video zoom determination logic 616. With the exception of certain elements that will be described below, each of these elements operates in essentially the same fashion as like named elements of example A/V capture device 100 as described above in reference to FIG. 1.

In contrast to video zoom control logic 106 of example A/V capture device 100, video zoom control logic 606 of A/V capture device 600 does not provide information to beamformer 634 that indicates the amount of video zoom currently being applied by video acquisition section 602. Instead, A/V capture device 600 includes video zoom determination logic 616 that determines the current amount of video zoom being applied by video acquisition section 602 by either monitoring the state of optics 622 within video acquisition section 602 or by analyzing the video signal generated by video acquisition section 602. This embodiment is intended to demonstrate that there are a variety of ways in which the amount of video zoom being applied by an video acquisition section can be determined.

E. Example A/V Capture Methods in Accordance with Embodiments of the Present Invention FIG. 7 depicts a flowchart 700 of a method for capturing audio and video in a spatially synchronized manner in accordance with an embodiment of the present invention.

Figure 7:
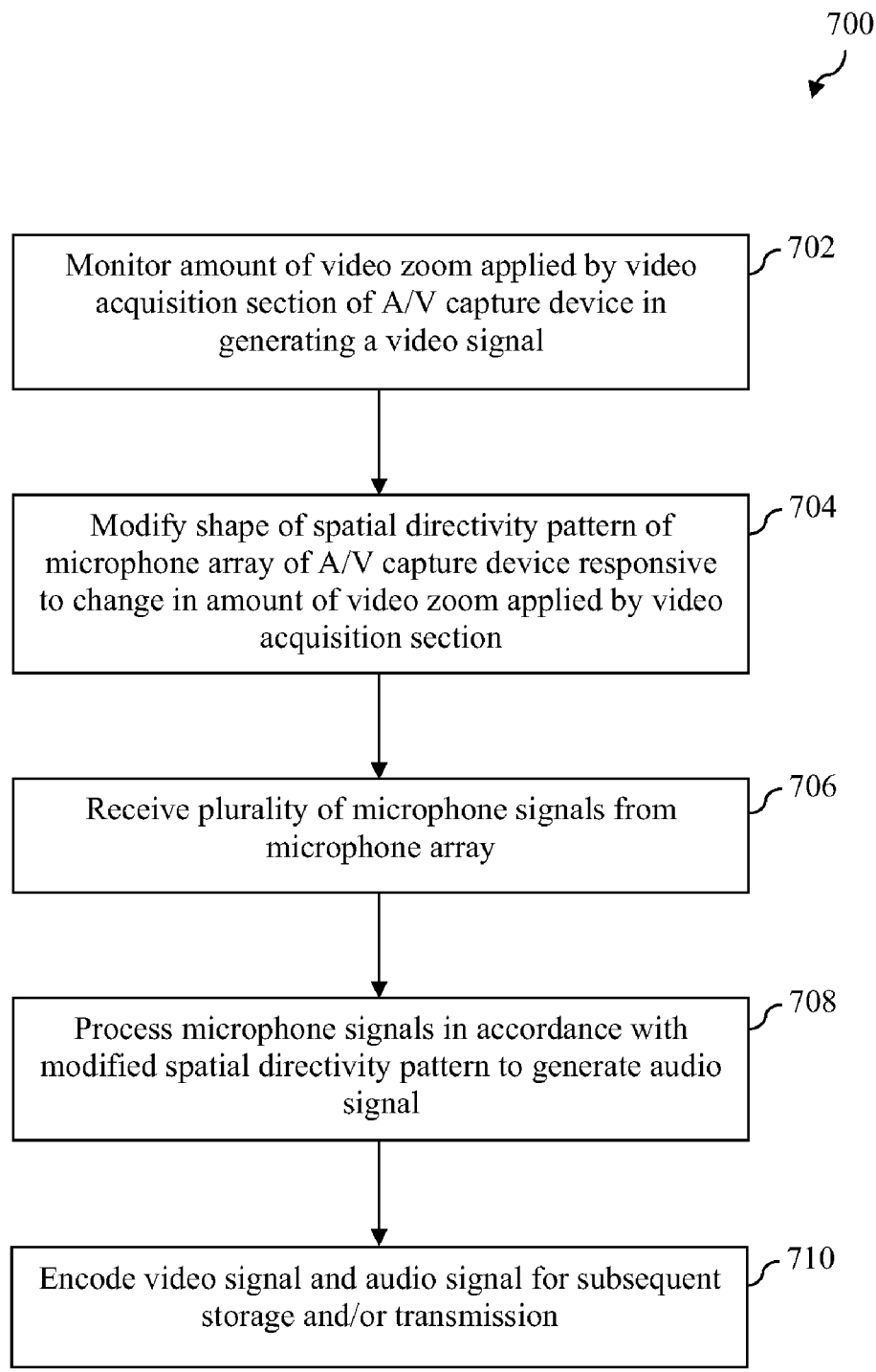
FIG. 7 depicts a flowchart of a method for capturing audio and video in a spatially synchronized manner in accordance with an embodiment of the present invention.

As shown in FIG. 7, the method of flowchart 700 begins at step 702, during which an amount of video zoom applied by a video acquisition section of an A/V capture device is monitored. Monitoring the amount of video zoom applied by the video acquisition section may include monitoring an amount of optical video zoom applied by a zoom lens. Monitoring the amount of video zoom applied by the video acquisition section may also include monitoring an amount of digital video zoom applied by a digital zoom processor.

At step 704, the shape of a spatial directivity pattern of a microphone array of the A/V capture device is modified responsive to a change in the amount of video zoom applied by the video acquisition section. This step may include modifying the shape of the spatial directivity pattern of the microphone array responsive to at least a change in the amount of optical video zoom applied by the zoom lens. This step may also include modifying the shape of the spatial directivity pattern of the microphone array responsive to at least a change in the amount of digital video zoom applied by the digital zoom processor. As discussed elsewhere herein, modifying the shape of the spatial directivity pattern of the microphone array comprises modifying a set of sensor weights used by a beamformer to produce an output audio signal. In one embodiment, this step may further comprise modifying a control parameter used to determine how sensor weights produced by two different types of beamformers are combined to generate a final set of sensor weights.

At step 706, a plurality of microphone signals is received from the microphone array.

At step 708, the microphone signals are processed in accordance with the modified spatial directivity pattern to generate an audio signal.

At step 710, the video signal and the audio signal are encoded for subsequent storage and/or transmission.

FIG. 8 depicts a flowchart 800 of an example method for performing step 704 of flowchart 700, which as noted above, involves modifying the shape of the spatial directivity pattern of the microphone array responsive to the change in the amount of video zoom applied by the video acquisition section. As shown in FIG. 8, the method of flowchart 800 includes a step 802, in which a width of a main lobe of the spatial directivity pattern of the microphone array is reduced responsive to an increase in the amount of video zoom applied by the video acquisition section. The method of flowchart 800 further includes a step 804, in which the width of the main lobe of the spatial directivity pattern of the microphone array is increased responsive to a reduction in the amount of video zoom applied by the video acquisition section.

FIG. 9 depicts a flowchart 900 of one example method for implementing the method of flowchart 800. As shown in FIG. 9, the method of flowchart 900 begins at step 902, in which a first vector of sensor weights corresponding to a first spatial directivity pattern from a first beamformer is received.

At step 904, a second vector of sensor weights corresponding to a second spatial directivity pattern from a second beamformer is received. The main lobe of the second spatial directivity pattern is narrower than a main lobe of the first spatial directivity pattern.

At step 906, a first weight and a second weight are determined based on the amount of video zoom currently being applied by the video acquisition section.

At step 908, the first weight is applied to the first vector to produce a weighted version of the first vector.

At step 910, the second weight is applied to the second vector to produce a weighted version of the second vector.

At step 912, the weighted version of the first vector is combined with the weighted version of the second vector to produce a third vector of sensor weights corresponding to a third spatial directivity pattern.

At step 914, the third vector of sensor weights is applied to the microphone signals to generate the audio signal.

In accordance with one implementation of the method of flowchart 900, the first beamformer comprises a delay-sum beamformer and the second beamformer comprises a superdirective beamformer. The superdirective beamformer may comprise, for example and without limitation, an MVDR beamformer.

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An audio/video (A/V) capture device, comprising:
a video acquisition section configured to generate a video signal;
video zoom control logic configured to control an amount of video zoom applied by the video acquisition section in generating the video signal; and
an audio acquisition section comprising
a microphone array configured to generate a plurality of microphone signals and
a beamformer configured to modify a shape of a spatial directivity pattern of the microphone array responsive to a change in the amount of video zoom applied by the video acquisition section and to process the microphone signals in accordance with the spatial directivity pattern to generate an audio signal, the beamformer comprising:
a first beamformer configured to output a first vector of sensor weights corresponding to a first spatial directivity pattern;
a second beamformer configured to output a second vector of sensor weights corresponding to a second spatial directivity pattern, wherein a main lobe of the second spatial directivity pattern is narrower than a main lobe of the first spatial directivity pattern;
first logic that determines a first weight and a second weight based on the amount of video zoom currently being applied by the video acquisition section;
a first multiplier that applies the first weight to the first vector to produce a weighted version of the first vector;
a second multiplier that applies the second weight to the second vector to produce a weighted version of the second vector;
a combiner configured to combine the weighted version of the first vector and the weighted version of the second vector to produce a third vector of sensor weights corresponding to a third spatial directivity pattern; and
second logic configured to apply the third vector of sensor weights to the microphone signals to generate the audio signal.

2. The A/V capture device of claim 1, further comprising:
A/V processing logic configured to encode the video signal and the audio signal for subsequent storage and/or transmission.

3. The A/V capture device of claim 1, wherein the first beamformer comprises a delay-sum beamformer and the second beamformer comprises a superdirective beamformer.

4. The A/V capture device of claim 3, wherein the superdirective beamformer comprises a Minimum Variance Distortionless Response (MVDR) beamformer.

5. The A/V capture device of claim 1, wherein the video acquisition section comprises a zoom lens and the video zoom control logic is configured to control an amount of optical video zoom applied by the zoom lens in generating the video signal, and
wherein the beamformer is configured to modify the shape of the spatial directivity pattern of the microphone array responsive to at least a change in the amount of optical video zoom applied by the zoom lens.

6. The A/V capture device of claim 1, wherein the video acquisition section comprises a digital zoom processor and the video zoom control logic is configured to control an amount of digital video zoom applied by the digital zoom processor in generating the video signal, and
wherein the beamformer is configured to modify the shape of the spatial directivity pattern of the microphone array responsive to at least a change in the amount of digital video zoom applied by the digital zoom processor.

7. A method, comprising:
monitoring an amount of video zoom applied by a video acquisition section of an A/V capture device in generating a video signal;
modifying a shape of a spatial directivity pattern of a microphone array of the A/V capture device responsive to a change in the amount of video zoom applied by the video acquisition section;
receiving a plurality of microphone signals from the microphone array; and
processing the microphone signals in accordance with the modified spatial directivity pattern to generate an audio signal;
wherein modifying the shape of the spatial directivity pattern of the microphone array comprises:
receiving a first vector of sensor weights corresponding to a first spatial directivity pattern from a first beamformer;
receiving a second vector of sensor weights corresponding to a second spatial directivity pattern from a second beamformer, wherein a main lobe of the second spatial directivity pattern is narrower than a main lobe of the first spatial directivity pattern;
determining a first weight and a second weight based on the amount of video zoom currently being applied by the video acquisition section;
applying the first weight to the first vector to produce a weighted version of the first vector;
applying the second weight to the second vector to produce a weighted version of the second vector;
combining the weighted version of the first vector and the weighted version of the second vector to produce a third vector of sensor weights corresponding to a third spatial directivity pattern.

8. The method of claim 7, further comprising:
encoding the video signal and the audio signal for subsequent storage and/or transmission.

9. The method of claim 7, wherein processing the microphone signals in accordance with the modified spatial directivity pattern to generate an audio signal comprises applying the third vector of sensor weights to the microphone signals to generate the audio signal.

10. The method of claim 7, wherein the first beamformer comprises a delay-sum beamformer and the second beamformer comprises a superdirective beamformer.

11. The method of claim 10, wherein the superdirective beamformer comprises a Minimum Variance Distortionless Response (MVDR) beamformer.

12. The method of claim 7, wherein monitoring the amount of video zoom applied by the video acquisition section comprises monitoring an amount of optical video zoom applied by a zoom lens, and
wherein modifying the shape of the spatial directivity pattern of the microphone array responsive to a change in the amount of video zoom applied by the video acquisition section comprises modifying the shape of the spatial directivity pattern of the microphone array responsive to at least a change in the amount of optical video zoom applied by the zoom lens.

13. The method of claim 7, wherein monitoring the amount of video zoom applied by the video acquisition section comprises monitoring an amount of digital video zoom applied by a digital zoom processor, and wherein modifying the shape of the spatial directivity pattern of the microphone array responsive to a change in the amount of video zoom applied by the video acquisition section comprises modifying the shape of the spatial directivity pattern of the microphone array responsive to at least a change in the amount of digital video zoom applied by the digital zoom processor.

14. The method of claim 7, further comprising monitoring an amount of optical video zoom applied by an optical zoom lens within the video acquisition section, and
wherein modifying the shape of the spatial directivity pattern of the microphone array responsive to at least a change in the amount of digital video zoom applied by the digital zoom processor comprises modifying the shape of the spatial directivity pattern of the microphone array responsive to both a change in the amount of optical video zoom applied by the zoom lens and a change in the amount of digital video zoom applied by the digital zoom processor.

15. An audio/video (A/V) capture device, comprising:
a video acquisition section configured to generate a video signal, the video acquisition section comprising a digital zoom processor;
video zoom control logic configured to control an amount of digital video zoom applied by the digital zoom processor in generating the video signal; and
an audio acquisition section comprising
a microphone array configured to generate a plurality of microphone signals and
a beamformer configured to modify a shape of a spatial directivity pattern of the microphone array responsive to at least a change in the amount of digital video zoom applied by the digital zoom processor and to process the microphone signals in accordance with the spatial directivity pattern to generate an audio signal.

16. The A/V capture device of claim 15, further comprising:
A/V processing logic configured to encode the video signal and the audio signal for subsequent storage and/or transmission.

17. The A/V capture device of claim 15, wherein the beamformer is configured to reduce a width of a main lobe of the spatial directivity pattern of the microphone array responsive to an increase in the amount of digital video zoom applied by the digital zoom processor and to increase the width of the main lobe of the spatial directivity pattern of the microphone array responsive to a reduction in the amount of digital video zoom applied by the digital zoom processor.

18. The A/V capture device of claim 15, wherein the beamformer is configured to selectively place one or more nulls in and/or selectively remove one or more nulls from the spatial directivity pattern of the microphone array based on the amount of digital video zoom applied by the digital zoom processor.

19. The A/V capture device of claim 15, wherein the video acquisition section further comprises a zoom lens and the video zoom control logic is further configured to control an amount of optical video zoom applied by the zoom lens in generating the video signal, and
wherein the beamformer is configured to modify the shape of the spatial directivity pattern of the microphone array responsive to both a change in the amount of optical video zoom applied by the zoom lens and a change in the amount of digital video zoom applied by the digital zoom processor.

20. A method, comprising:
monitoring an amount of digital video zoom applied by a digital zoom processor within a video acquisition section of an A/V capture device in generating a video signal;
modifying a shape of a spatial directivity pattern of a microphone array of the A/V capture device responsive to at least a change in the amount of digital video zoom applied by the digital zoom processor;
receiving a plurality of microphone signals from the microphone array; and
processing the microphone signals in accordance with the modified spatial directivity pattern to generate an audio signal.

21. The method of claim 20, further comprising:
encoding the video signal and the audio signal for subsequent storage and/or transmission.

22. The method of claim 20, wherein modifying the shape of the spatial directivity pattern of the microphone array responsive to at least the change in the amount of digital video zoom applied by the digital zoom processor comprises:
reducing a width of a main lobe of the spatial directivity pattern of the microphone array responsive to an increase in the amount of digital video zoom applied by the digital zoom processor and
increasing the width of the main lobe of the spatial directivity pattern of the microphone array responsive to a reduction in the amount of digital video zoom applied by the digital zoom processor.

23. The method of claim 20, wherein modifying the shape of the spatial directivity pattern of the microphone array responsive to the change in the amount of digital video zoom applied by the digital zoom processor comprises:
selectively placing one or more nulls in and/or removing one or more nulls from the spatial directivity pattern of the microphone array based on the amount of digital video zoom applied by the digital zoom processor.

* * * * *